United States

Hosokawa et al.

[11] 3,881,807
[45] May 6, 1975

[54] LIQUID CRYSTAL DISPLAY FOR SMALL-SIZED ELECTRONIC CALCULATOR

[75] Inventors: Minoru Hosokawa; Kouji Kakizawa, both of Suwa, Japan

[73] Assignee: Kabushiki Kaisha Suwa Seikosha, Tokyo, Japan

[22] Filed: Dec. 3, 1973

[21] Appl. No.: 421,315

Related U.S. Application Data

[63] Continuation-in-part of Ser. No. 197,379, Nov. 10, 1971, abandoned.

[30] Foreign Application Priority Data

Nov. 12, 1970 Japan.............................. 45-111928

[52] U.S. Cl....................... 350/160 LC; 340/324 R
[51] Int. Cl....................... G02f 1/28; G08b 23/00
[58] Field of Search........... 350/160 LC; 340/324 R, 340/336

[56] References Cited
UNITED STATES PATENTS

| | | | |
|---|---|---|---|
| 3,499,112 | 3/1970 | Heilmeirer et al........ | 350/160 LC X |
| 3,592,527 | 7/1971 | Conners........................ | 350/160 LC |

*Primary Examiner*—Alfred E. Smith
*Assistant Examiner*—Rolf Hille
*Attorney, Agent, or Firm*—Blum, Moscovitz, Friedman & Kaplan

[57] ABSTRACT

A cover for at least a portion of the top surface of a small-sized electronic calculator is provided, a portion of said cover being adapted to transmit light onto the display surface, the cover also being dimensioned to be large relative to the display surface of the liquid crystal display of said calculator so as to insure proper contrast for said display surface.

3 Claims, 7 Drawing Figures

LIQUID CRYSTAL DISPLAY FOR SMALL-SIZED ELECTRONIC CALCULATOR

CROSS REFERENCE TO RELATED INVENTIONS

This application is a continuation-in-part of abandoned U.S. Application Ser. No. 197,379, filed Nov. 10, 1971.

BACKGROUND OF THE INVENTION

This invention relates to small-sized electronic calculators incorporating liquid crystal displays. The utility of such liquid crystal displays depends in large measure on the contrast between the displayed numerical or alpha-numerical information and the background thereof. Where said liquid crystal displays are illumintated by light directed from the front side of the display, the light reflected from the display must be intercepted before it reaches the eye of the observer in order to insure proper visibility and contrast of the displayed information. When this is done, a contrast between light applied to the dispersing portion thereof is produced. Generally, the desired result has been produced by the provision of a black curtain in the path of the reflection of light to the eye of the observer, but the prior art arrangements for this purpose have resulted in substantial disadvantages when applied to small-sized electronic calculators of the portable or table type.

SUMMARY OF THE INVENTION

Generally speaking, in accordance with the invention, a small-sized electronic calculator is provided having liquid crystal display means formed with a display surface and cover means pivotably displaceable between a first position in which said cover overlays said display means display surface and a second position at which said cover means intercepts reflected light from said display surface and is also adapted to pass light from behind the cover onto the display means to enhance the viewing of the display. The electronic calculator is formed with an operative surface including said display surface, said cover means being pivotably mounted along the axis of pivoting on one side of said display surface and being dimensioned to cover the display surface along the operative surface thereof when in said first position to thereby protect the surface.

A light source disposed on the intercepting surface of the cover, proximate the operative display surface further enhances viewing of the operative display means under darkened conditions.

Accordingly, it is an object of the instant invention to provide a cover for a desk calculator having a liquid crystal display, wherein the cover enhances the viewability of such display elements.

Another object of the instant invention is to provide a calculator display which is adapted for use over long periods of time wherein the eyes of the viewer do not become easily tired by viewing same.

Still another object of the invention is to provide a digital display for a calculator utilizing passive elements which are clearly viewable in light or dark conditions.

Still another object of the instant invention is to provide a calculator wherein the display surface thereof is protected from shock, dust and inadvertent use by the shape of such cover.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1A:
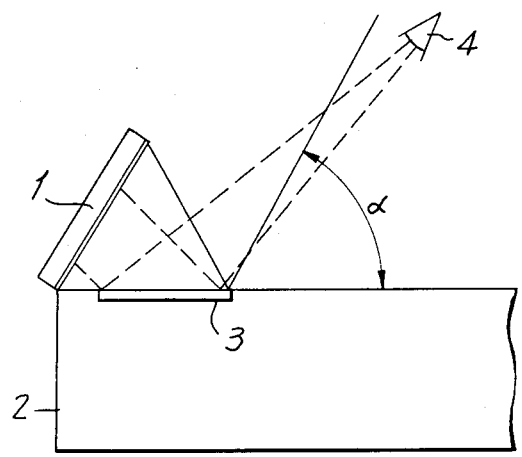
FIGS. 1a and 1b show two prior art approaches for providing screens for interrupting light in electronic calculators.

Referring now to FIG. 1a, one prior art approach for providing a screen for interrupting reflected light through the liquid crystal display surface of an electronic calculator is depicted. In said embodiment, a cover 1 is pivotably mounted on the housing 2 of the calculator and dimensioned so as to cover just the display surface of the liquid crystal display 3. In this embodiment, the observer's eye 4 must be below the angle alpha to insure that reflected light is intercepted by the cover 1. As this angle is relatively small, viewing of the display becomes somewhat invonvenient. The angle alpha is further limited by the extent to which the cover 1 can be opened.

Figure 1B:
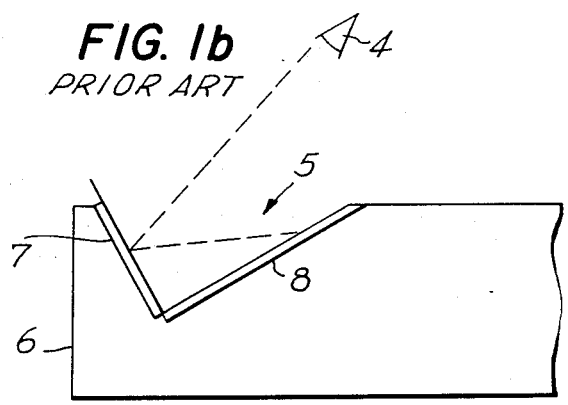

In the prior art embodiment of FIG. 1b, a relatively deep groove 5 is formed in the surface of the housing 6, one wall of said groove being defined by the liquid crystal display 7, the other wall of said groove being defined by inclined surface 8, which is blackened to avoid reflection therefrom. As is seen in FIG. 1b, the reflected light coming from the direction of the user's eye is intercepted by the inclined surface 8. However, this approach is inappropriate for use in small-sized electronic calculators since the groove results in an increase in the overall dimensions of such caculator.

Figure 2:
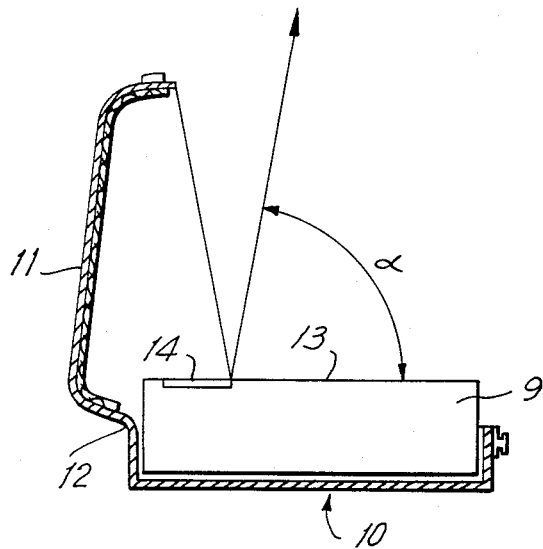
FIGS. 2 and 3 show first and second embodiments respectively of the liquid crystal display for small-sized electronic calculators according to the invention.

Referring now to FIG. 2, one embodiment of the arrangement according to the invention is depicted. In said embodiment, small-sized electronic calculator 9 is provided with a case 10 which encloses the entire calculator. Case 10 is formed with a cover portion 11 pivotably mounted along line 12 between a closed position in which all of operative surface 13 of calculator 9, including the surface of liquid crystal display 14 is covered, and a second position depicted in FIG. 2 wherein said cover serves to absorb light reflected from the display surface of said liquid crystal display. Case 10 may be formed of leather or vinyl so as to provide protection to the calculator 9. The cover 11 is designed so as to pivotable in a direction away from the liquid crystal display 14 so as to be on the opposite side of said liquid crystal display from the observer. The arrangement of FIG. 2 permits a relatively large viewing angle alpha as compared with the maximum viewing angle of the embodiment of FIGS. 1a and 1b.

Figure 3:
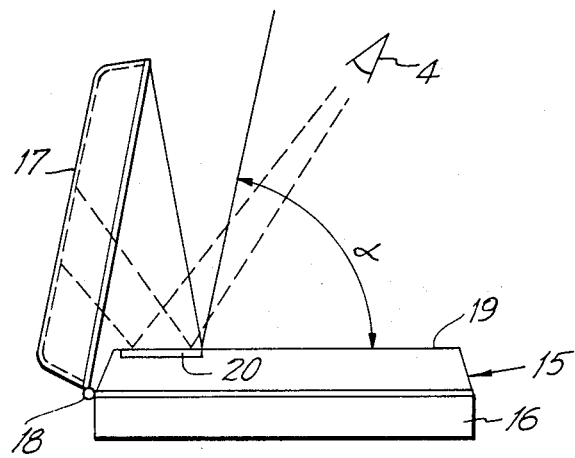

In the embodiment of FIG. 3, the calculator is provided with a housing 16 having a cover 17 pivotably mounted by hinge 18 on said casing and dimensioned so as to cover the entire operative surface 19 of said calculator, including the surface of liquid crystal display 20. The cover 17 serves to intercept reflected light from the surface of liquid crystal display 20 and offers the same advantages as cover portion 11 of the embodiment of FIG. 2.

The arrangement according to the invention utilizes a cover of sufficiently large dimensions, as compared with the dimensions of the display surface of the liquid crystal display so that reflected light is intercepted even if the cover is opened to a relatively large angle relative to the operative surface of said calculator. The inner surface of the cover according to the invention is preferably defined by a substantially non-reflective, black, rough surface such as velvet cloth, carpet or the like.

Figure 4:
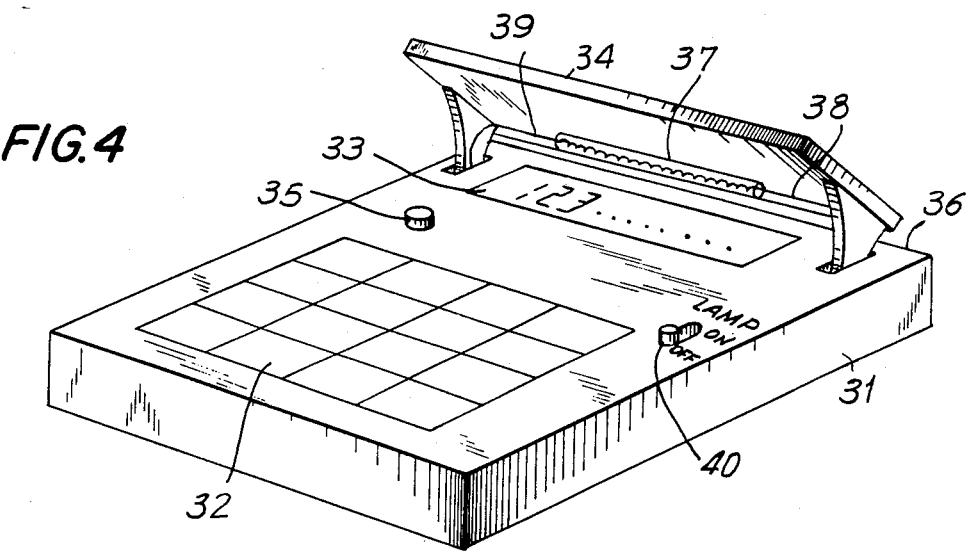
FIG. 4 shows still another embodiment of a liquid crystal display for a small-sized electronic calculator according to the invention.

Reference is now made to FIG. 4, wherein an electronic calculator 31 having a keyboard 32 disposed on the top surface thereof is depicted. The keyboard 32 includes register keys for providing input means for effecting calculations with the calculator. The calculator includes a liquid crystal display formed of D.S.M. liquid crystals or F.E.M. liquid crystals or other such passive-type liquid crystal displays. A pushbutton 35 is disposed on the top surface of the calculator and effects the opening of a cover 34 so that the digital display 33 becomes viewable. Push button 35 is also coupled to the energy source (not shown) contained in the electronic calculator so that the power for operating the calculator is actuated simultaneously with the opening of the cover 34.

The cover 34 is constructed so that a gap 36 is formed between the calculator 31 and the cover 34 when such cover is open in the manner depicted in FIG. 4. As is appreciated, the gap 36 allows light to be incident upon the liquid crystal display elements from the rear of the display. The light from behind the display in combination with the light from the front of the display when D.S.M. liquid crystals or F.E.M. liquid crystals are utilized, makes such crystal display far clearer, to thereby enhance viewing thereof.

A light source 37 which is mounted to the cover 34 preferably near the lower portion thereof to render same close to the display elements, is coupled through lead wires 38 and 39 and an on/off switch 40 to a power source. An electric light having a filament or a light emitting element such as a light emitting diode can be used for the light source 37. When a calculator having such a light source is used under light conditions the switch 10 is placed in the off position, the daylight incident upon the display elements being sufficient to illuminate same. However, when the calculator is to be used in darkness, the switch 37 is displaced to the on position so that the light source 37 will disperse light on the display element to thereby achieve an increased lighting effect and obtain very high lighting efficiency of the digital display. Thus although passive elements such as liquid crystals are utilized in the digital display, by the combination of light from the rear being incident on the display elements and a light source disposed in proximity to the digital surface, an improved digital display on a portable electronic desk calculator is provided.

Figure 5:
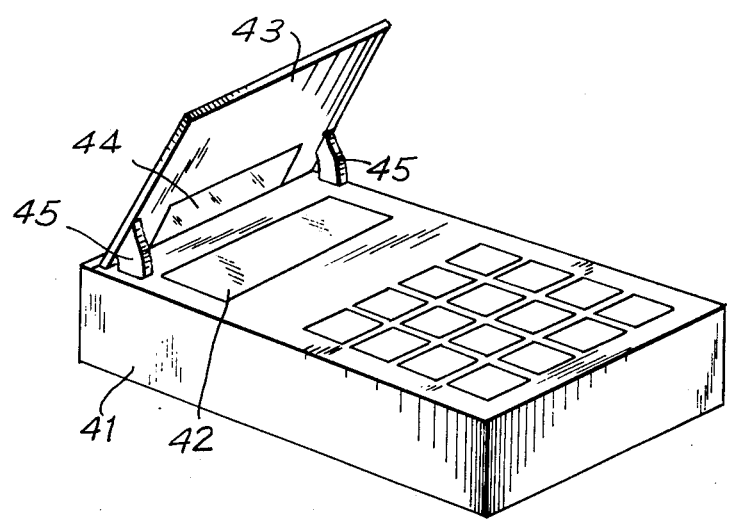
FIGS. 5 and 6 show still other embodiments of a cover for a liquid crystal display small sized electronic calculator constructed in accordance with the invention.
Figure 6:
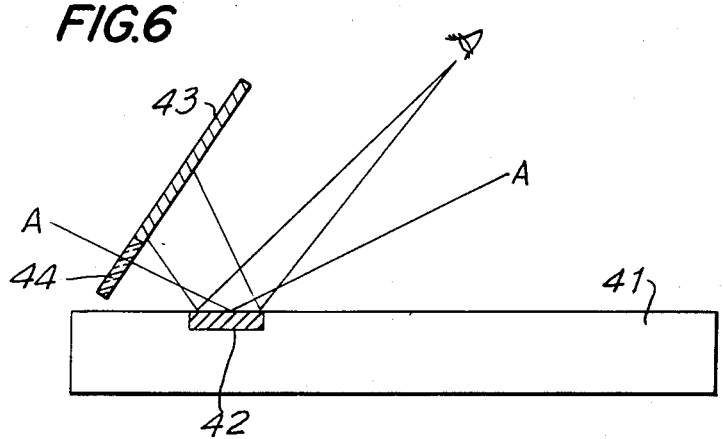

Referring now to FIGS. 5 and 6, a desk calculator 41 having a digital display 42 and a cover 43 is depicted. The cover, which although shown in a shortened configuration, can be constructed in the same manner as the cover 11 depicted in FIG. 2 and the cover 17 depicted in FIG. 3 so that such cover is displaceable in an open or closed position and is further adapted to cover the entire calculator surface to provide protection for the calculator keys when such hood is in a closed position. The cover 43 is further provided with a transparent plate 44 to provide light from the rear of the digital display. By the provision of such a transparent plate 44, light passes through the transparent plate as shown by the line A—A, yet does not come directly into the sight of the viewer. When the light is applied from the rear of a cover, which cover includes a good light absorption coating on the surface which intercepts the reflected light, the liquid crystal display elements becomes brighter and the constrast enhanced to render such display elements more easily viewed by the viewer. Moreover, such a display can be viewed for longer periods of time without causing eye fatigue.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. In a small-sized electronic calculator, the improvement which comprises liquid crystal display means having a display surface disposed on said calculator; and cover means pivotally mounted on said calculator for displacement between a first position in which said cover overlays said liquid crystal display surface, the second position in which said cover is positioned to intercept light reflected from said liquid crystal display surface relative to the eye of the observer, said cover further including a transparent plate proximate the viewing surface of the calculator to provide light from behind the cover to thereby enhance the contrast of said display device to the eye of the observer.

2. In a small-sized electronic calculator as claimed in claim 1 wherein said cover includes a black surface and a light source and a switch coupled thereto, said light source being disposed on the black surface of said cover proximate to the digital display to enhance viewing of the digital display under darkened conditions.

3. In a small-sized electronic calculator, the improvement which comprises liquid crystal display means having a display surface positioned on said calculator; and cover means pivotally mounted on said calculator for displacement between a first position in which said cover overlays said liquid crystal display surface, and a second position in which said cover is positioned to intercept light reflected from said liquid crystal display surface relative to the eye of the observer, said cover including a transparent plate disposed in proximity to the crystal display surface for providing incident light from behind the cover onto the display surface, said calculator being formed with an operative surface including said display surface, said cover means being pivotally displaceable along the line on one side of display surface, and being dimensioned to extend along said operative surface at a substantial distance beyond the other side of display surface so as to cover all of said operative surface when said cover means is in said first position, the inner surface of said cover means except in the region of said transparent plate being formed of substantially non-reflective black material having a rough surface.

* * * * *